3,518,347
VACCINE FOR EQUINE INFLUENZA
Vytautas Pavilanis, Paul Marois, Armand Boudreault, and Jean Claude Gilker, Montreal, Quebec, Canada, assignors to L'Institut de Microbiologie et d'Hygiene de l'Universite de Montreal, Laval des Rapides, Quebec, Canada, a corporation of Canada
No Drawing. Filed May 28, 1965, Ser. No. 459,873
Int. Cl. A61k 23/00
U.S. Cl. 424—89    4 Claims

ABSTRACT OF THE DISCLOSURE

Myxoviruses which cause equine influenza in horses cannot be used to produce vaccines which elicit a satisfactory immunological response and give adequate protection to horses inoculated with such vaccines. However, these myxoviruses potentiate the antigenicity of viruses of human strains of influenza virus in horses and when strains of human influenza virus are combined with strains of equine influenza virus, a vaccine can be produced which protects horses from equine influenza better than a vaccine containing only the human influenza virus.

---

This invention relates to a vaccine for equine influenza and to methods of preparing and using the same.

Equine influenza is a highly contagious, acute, febrile disease of horses caused by a myxovirus having properties of the Type A influenza viruses. Outbreaks of the disease were reported in various parts of Europe in the mid 1950's and in 1963, outbreaks of equineinfluenza occurred in North America at race tracks in Miami, Chicago, Toronto, Montreal, and other areas.

Equine influenza is caused by several strains of myxoviruses such as A/Equi/Prague/56, A/Equi/2/Richelieu, A/Equi/2/Lexington, and others. The disease is transmitted by particulate matter suspended in the air, by direct contact, and indirectly by contaminated food, water, and equipment.

Equine influenza is initiated by fever, serious rhinitis, apathy, loss of appetite, and fatigue. The pulse and respiratory rates are increased, the nasal mucosa becomes congested and mucopurulent discharge comes from the nostrils. The disease is not generally fatal, but it is debilitating and the horses may develop bronchitis, pneumonia, or other complications as side effects. Antibiotics and sulfa drugs do not influence the viral infection and up to the present time, a vaccine for equine influenza has not been available.

Although it has been found that horses which have had equine influenza have a degree of immunity to reinfection, vaccines prepared from myxoviruses taken from infected animals do not develop a satisfactory immunological response, and is is for this reason that an effective vaccine has not been produced.

As illustrative of the foregoing, a vaccine was prepared from an equine influenza Richelieu strain virus isolate and two groups of horses were inoculated. The first group of ten horses received three 3 cc. injections of the virus vaccine containing 320 CCA (chicken cell agglutaination) units per cc. The second inoculation was made twenty-four days after the first, and the third inoculation was made forty-eight days after the second. The second group of ten horses received three inoculations of 5 cc. doses of the same virus at the same spaced intervals. Bleedings were made prior to inoculation, at the time of the second and third inoculations, and thirty-four days after the last inoculation. Only two of the inoculated animals developed any complement fixation Type A antibodies which were detectable at the second bleeding, and these were very weak—⅛ and ¹⁄₁₆ respectively—but even in these cases, this low titer was not observed at subsequent bleedings.

In another experiment twenty-seven horses were each inoculated with 5 cc. of a bivalent vaccine containing another strain of A/Equi[2] virus isolated in Kentucky during the 1963 epizootic and the A/Equi[1]/Prague virus, the inoculating injection containing 1,000 units CCA/cc. of each of the strains. These horses ranged in age from eight months up through seventeen years. In no cases was there observed the development of complement fixation Type A antibodies as a result of the inoculation.

From these experiments it is apparent that the equine strains of influenza virus do not have the capacity to initiate any immunological response worth mentioning in horses.

Surprisingly it has been found that while equine strains of influenza virus do not produce specific serological response when inoculated into horses, strains of the human influenza virus are effective. An experiment illustrating this fact was performed as follows:

A group of horses was inoculated with 3 cc. of a vaccine containing 400 CCA/cc. units of human Type A and 100 CCA/cc. units of human Type B strains. None of the horses had a complement fixation Type A antibody prior to the vaccination. The antibodies were determined two weeks after the first vaccination whereupon some of the horses were again vaccinated with 3 cc. of the human influenza virus vaccine and the antibody titer was determined again after two weeks. These horses were then allowed field contact with contaminated horses to determine their resistance to natural infection. The results obtained are in Table I.

As will be seen from the results in Table I below, the horses that had recevied one vaccination were partially protected whereas those that had received the two inoculations had an effective degree of resistance.

Still more surprising, it was found that when horses were vaccinated with a vaccine containing both equine influenza virus strains and human influenza virus, a greater degree of antigenicity was developed than was found to be the case when horses were inoculated with either of the equine or human influenza virus vaccine alone.

The equine influenza vaccine used was prepared by the following method: Each strain of influenza virus is inoculated into carefully selected chicken embryos that have been incubated at 37° C. for eleven days. After forty-eight hours of incubation, the allantoic fluid is aseptically harvested and tested for sterility. Formaldehyde is added

TABLE I.—HORSES NOT EXPOSED TO INFECTION PRIOR VACCINATION

| | | Complement fixation type A antibodies | | |
|---|---|---|---|---|
| | | Post vaccination titers 2 weeks after vaccination | | |
| Age | Prevaccination titers | 1st vaccination | 2nd vaccination | Field contact with contaminated horses resistance to infection |
| 4 | 0 | 1/16 | 1/16 | Yes. |
| 3 | 0 | | | |
| 3 | 0 | 1/16 | 1/64 | Yes. |
| 3 | 0 | 1/32 | 1/128 | Yes. |
| 5 | 0 | 1/32 | 1/128 | Yes. |
| 6 | 0 | 1/32 | 1/32 | Yes. |
| 3 | 0 | 1/64 | 1/64 | Yes. |
| 11 | 0 | 1/16 | Not Done | Slight cough. |
| 2 | 0 | 1/32 | do | Yes. |
| 2 | 0 | 1/8 | do | Not exposed. |
| 2 | 0 | 1/128 | do | Slight cough. |
| 5 | 0 | 1/128 | do | Do. |
| 4 | 0 | 1/128 | do | Yes. |
| 5 | 0 | Not Done | do | (1). |
| 4 | 0 | do | do | (1). |
| 5 | 0 | do | do | (1). |
| 2 | 0 | do | do | (1). |
| 4 | 0 | do | do | (1). |
| 7 | 0 | do | do | (1). |
| 4 | 0 | do | do | (1). |
| 2 | 0 | do | do | (1). |
| ? | 0 | do | do | (1). |
| 4 | 0 | 1/64 | do | Yes. |
| 5 | 0 | 1/64 | do | Yes. |
| ? | 0 | 1/8 | do | Yes. |
| ? | 0 | 1/16 | do | Yes. |
| ? | 0 | 1/16 | do | Yes. |
| ? | 0 | 1/16 | do | Yes. |

[1] These horses were vaccinated only once. All became sick within ten days after the first inoculation but most were not as ill as nonvaccinated horses except for one who became ill two days after vaccination.

at a concentration of 1 in 4,000, in the cultures which are kept at room temperature for seven hours and then at 4° C. for seven days. The inactivated cultures are then centrifuged at 50,000 r.p.m. Titration is made on the concentrated material by the hemagglutination method (CCA). Absence of living virus is controlled by two consecutive passages in chicken embryo of the vaccine at four concentrations: undiluted, $10^{-1}$, $10^{-2}$, and $10^{-3}$. These tests being negative, the concentrated vaccine of each is properly diluted in physiological saline buffered by sodium phosphat at a pH of 7.0. Merthiolate at a concentration of 1 in 10,000 is added as preservative. The titration of the final product is calculated as a mean of the results obtained in eight consecutive titrations.

The purity test is done by the hemagglutination technique. The safety test consists of bacteriological tests done with thioglycollate fluid medium and of injections into mice intraperitoneally and into guinea-pigs subcutaneously.

The inoculating vaccine was composed of several strains of human influenza virus and two strains of equine influenza virus as follows.

Human strains: Units CCA
- A/PR-8/54 — 100
- $A_1$/PR-301/54 — 100
- $A_2$/Aust/57 — 100
- $A_2$/Montreal/63 — 100

Equine strains:
- $A_1$equi/Prague/56 — 200
- $A_2$equi/Richelieu/63 — 200

The $A_2$equi/Richelieu/63 strain was isolated from a pool of nasal secretions of sick horses during an outbreak of Type $A_2$ influenza. Seven horses housed in the same barn were bled and inoculated on the same day subcutaneously with 3 milliliters of the above described polyvalent vaccine. Two weeks later the horses were bled and reinoculated on the same day with another 3 milliliters of the same vaccine. Two weeks later the horses were again bled and the serum examined with the following results:

TABLE II.—COMPLEMENT FIXATION TEST

| Horse No. | Serum No. | Titer |
|---|---|---|
| B-1 | 1 | --- |
| | 2 | 1/64 |
| | 3 | 1/128 |
| B-2 | 1 | 0 |
| | 2 | 1/128 |
| | 3 | 1/512 |
| B-3 | 1 | 0 |
| | 2 | 1/32 |
| | 3 | 1/128 |
| B-5 | 1 | 0 |
| | 2 | 1/16 |
| | 3 | 1/64 |
| B-6 | 1 | 0 |
| | 2 | 1/32 |
| | 3 | 1/128 |
| B-7 | 1 | 0 |
| | 2 | --- |
| | 3 | 1/256 |

As will be seen from a comparison of the titers of Table II with those of Table I, the addition of equine strains to the vaccine composed of the human influenza strains alone increased the antigenicity of the product considerably. This is surprising in view of the fact that the equine influenza virus had no appreciable antigenicity when injected in the horses.

The CCA values were determined by a method well known in the art which is a modification of the method described by Miller and Stanley (J. Exp. Med., 79: 185, 1944). A more detailed description of the method was published by the Federal Security Agency, National Institute of Health, on Sept. 16, 1946, under the title "Titration of the Chicken Red Cell Agglutination (CCA) Value."

While the preparation of the equine influenza vaccine has been described in detail with reference to the use of the allantoic fluid of chicken embryos and inactivation with formaldehyde, it will be understood that the virus of both the human Type A and the equine strains may be derived from any suitable and conventional source such as tissues of infected animals, the allantoic fluid of incubating eggs, from in vitro tissue cultures, or other media in which the human or equine influenza virus will propagate. Inactivation may be by any of the several known techniques which will kill the virus without destroying the antigenicity of the material.

Although a preferred form of the vaccine is described as containing 400 CCA units of four human strains of influenza virus and 400 units of two equine strains of influenza virus, it will be understood that the final vaccine may contain other strains and also more or fewer strains of either the human or equine influenza virus. It will also be understood that the number of CCA units of each of the human and equine viral strains may vary. A suitable vaccine will contain per milliliter at least 100 CCA units of a human strain and at least 100 units of equine strain. Normally more CCA units than these minimum amounts will be contained in the final vaccine per milliliter but more than a total of about 1,000 CCA units per milliliter is unnecessary.

It will also be understood that the inoculating dosage may vary from about one milliliter to five milliliters or more of the bivalent vaccine according upon the potency of the vaccine as well as the size, age, and condition of the horse to be inoculated. Although, as noted herein, one inoculation will give rise to the production of protective antibodies, it is preferred that several inoculations be given to achieve maximum protection. For example, three inoculations at two-week intervals, or at longer intervals of a month or more, may be given. It is also suggested that booster inoculations be given each year, particularly where the horse is in contact with other animals which are likely to be infected as at race tracks where animals from various parts of the country are being brought in from time to time.

What is claimed is:

1. An injectable liquid vaccine which comprises an injectable liquid carrier containing in each milliliter at least 100 CCA units of an inactivated equine influenza virus and at least 100 CCA units of an inactivated human Type A influenza virus.

2. An injectable liquid vaccine which comprises an injectable liquid carrier which contains in each milliliter at least 400 CCA units of the antigens of a plurality of human strains of Type A influenza virus and at least 400 CCA units of the antigens of a plurality of equine Type A strains of influenza virus, said vaccine being inactivated as to the virus.

3. A vaccine which comprises an aqueous carrier containing in each milliliter thereof inactivated strains of human influenza virus and equine strains of influenza virus of the following composition.

| Human strains: | Units CCA |
|---|---|
| A/PR–8 | 100 |
| $A_1$/PR–301 | 100 |
| $A_2$/Aust | 100 |
| $A_2$/Montreal | 100 |

| Equine strains: | Units CCA |
|---|---|
| $A_1$equi/Prague | 200 |
| $A_2$equi/Richelieu | 200 |

4. A method of vaccinating horses against infection with equine influenza virus which comprises injecting horses with a liquid vaccine containing in each milliliter thereof at least 100 CCA units of an inactivated equine influenza virus and at least 100 CCA units of an inactivated human Type A influenza virus.

References Cited

Marois et al., Rev. Can. Biol., vol. 23, No. 2, pp. 285–289, September 1964.

Brander et al., The Veterinary Record, vol. 77, No. 19, May 8, 1965, pp. 548 and 549.

Fleming, Veterinary Medicine, vol. 58, November 1963, p. 93.

Journal of the American Pharmaceutical Association, Practical Pharmacy Ed., January 1946, pp. 6–9.

RICHARD L. HUFF, Primary Examiner